Dec. 29, 1953        A. WEHRLI        2,664,495
ELECTRIC COOKING DEVICE
Filed Aug. 18, 1950        4 Sheets-Sheet 1
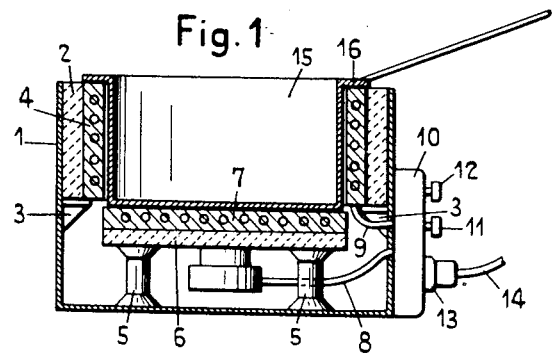
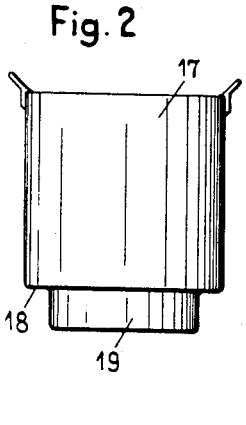
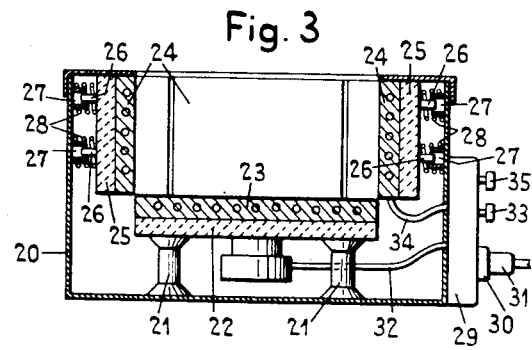
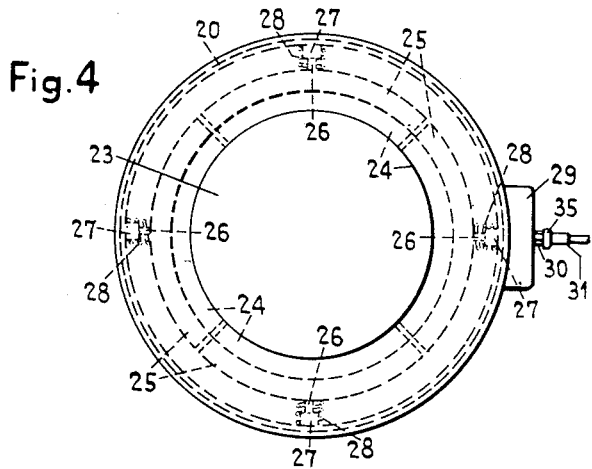
INVENTOR.
Alfred Wehrli
BY
Michael S.␣␣␣

Dec. 29, 1953 A. WEHRLI 2,664,495
ELECTRIC COOKING DEVICE
Filed Aug. 18, 1950 4 Sheets-Sheet 2

INVENTOR.
Alfred Wehrli
BY

Dec. 29, 1953
A. WEHRLI
2,664,495
ELECTRIC COOKING DEVICE
Filed Aug. 18, 1950
4 Sheets-Sheet 3
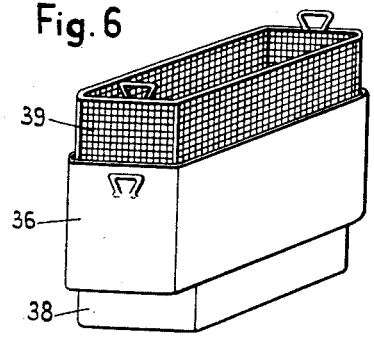
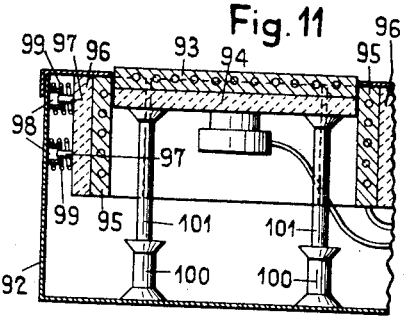
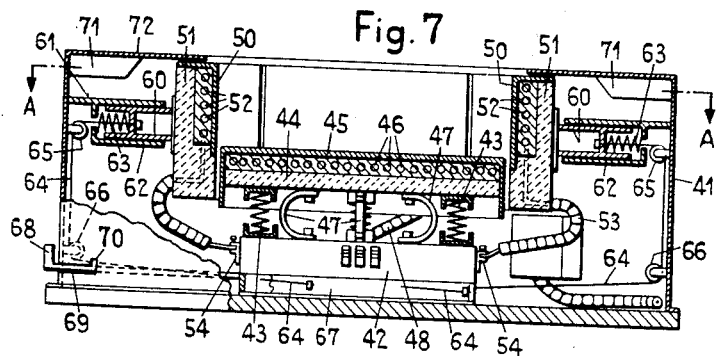
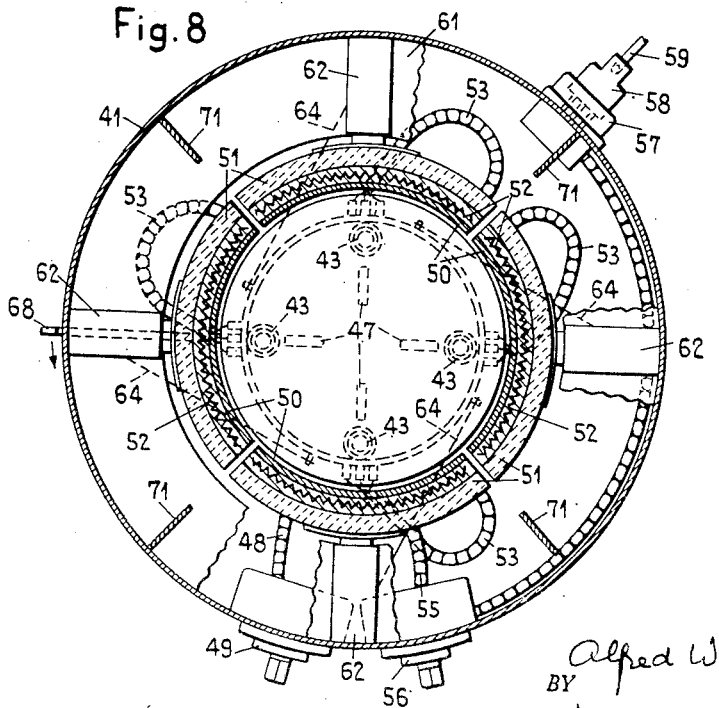
INVENTOR.
Alfred Wehrli
BY
Michael S. ...

Dec. 29, 1953  A. WEHRLI  2,664,495
ELECTRIC COOKING DEVICE
Filed Aug. 18, 1950
4 Sheets-Sheet 4

INVENTOR.
Alfred Wehrli
BY

Patented Dec. 29, 1953

2,664,495

UNITED STATES PATENT OFFICE 2,664,495

ELECTRIC COOKING DEVICE

Alfred Wehrli, Islikon, Switzerland

Application August 18, 1950, Serial No. 180,136

Claims priority, application Switzerland
August 19, 1949

3 Claims. (Cl. 219—43)

The present invention relates to an electric cooking device which is provided with a housing, the walls of which are formed with a heat-insulating lining, and in which at least one electric heater is provided which is so constructed that it may receive at least part of the cooking vessel to be heated and may heat its outer surface as well as its bottom.

The electric quick cooker according to the invention enables the cooking vessels to be rapidly heated and is particularly suitable for preparing foods which have to be cooked. fried or steamed, quickly and at great heat. Cooking vessels may be used of a kind which are adapted to be completely inserted in the heater or heaters, and also cooking vessels having a lug which, being of smaller diameter at its lower end than elsewhere, is adapted to engage in the heater or heaters.

The electric cooking device according to the invention may be formed with two electric heaters, one of which heats the bottom and the other at least part of the outer surface of the cooking vessel. The heater heating the outer surface of the cooking vessel may, furthermore, be divided into three or more plates which are movably mounted and which are pressed against the outer surface of the cooking vessel by means of springs, a mechanical lifting device being advantageously provided by means of which these movably mounted plates may be moved away from the outer surface of the cooking vessel when inserting and removing the cooking vessel. The heater heating the bottom of the cooking vessel may also be resiliently mounted in such manner that it is always pressed against the bottom of the cooking vessel.

Figure 5:
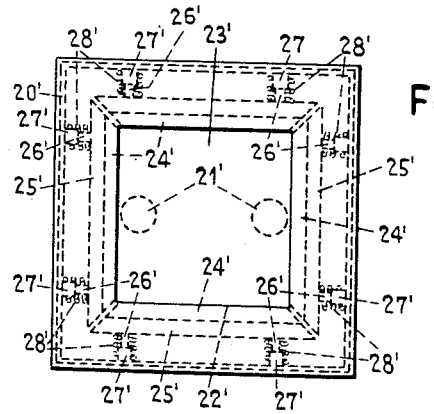
Figure 9:
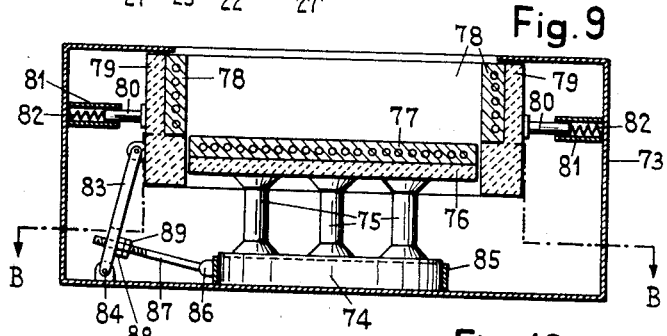
Figure 10:
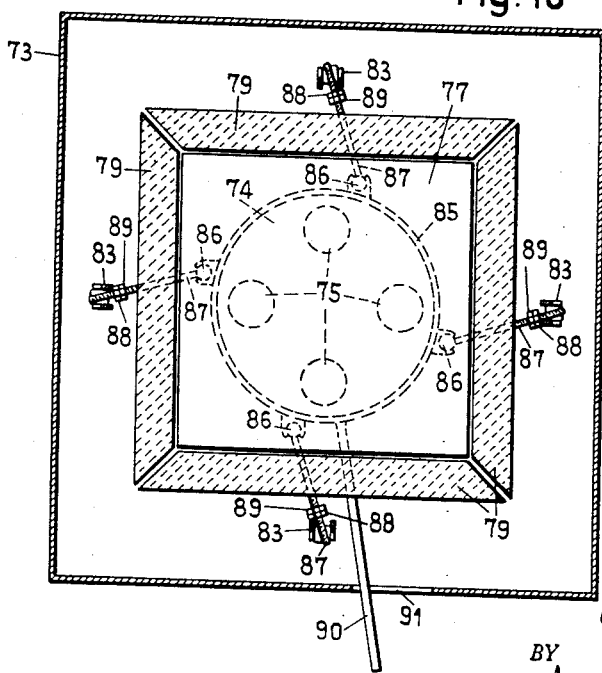
Figure 12:
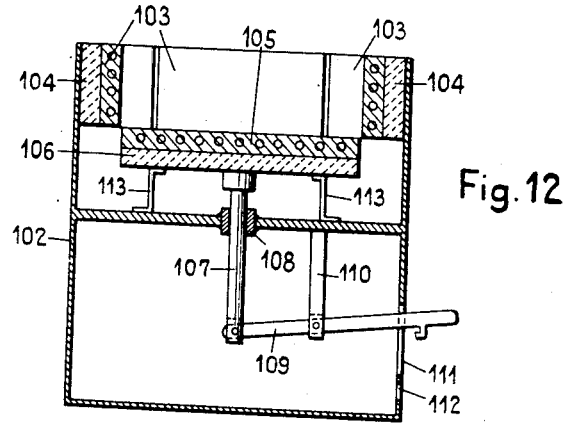
Figure 13:
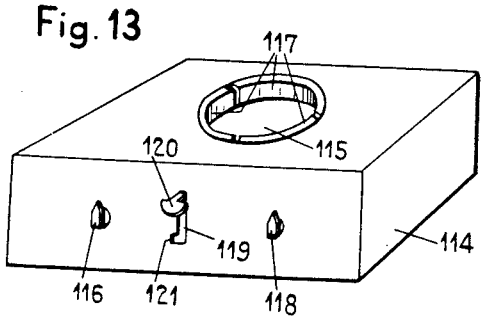
Figure 14:
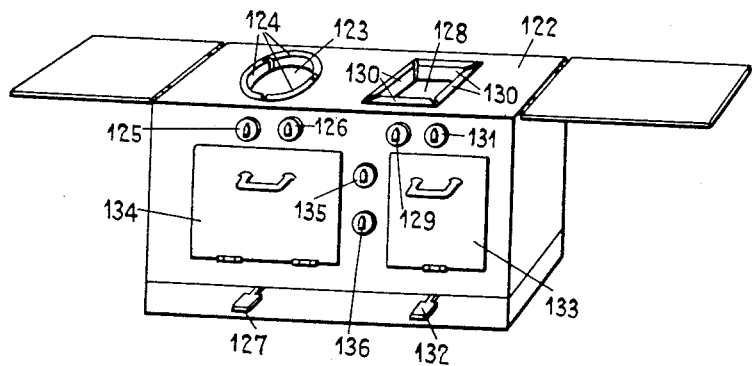

Seven constructions of the device according to the invention and two modifications are diagrammatically illustrated by way of example in the accompanying drawings, in which:

Figure 1 is a vertical section through the first construction of the electric cooking device, Figure 2 is a lateral view of another cooking vessel which may be used in conjunction with the cooking device according to the invention, Figure 3 is a vertical section through a second construction of the electric cooking device, Figure 4 is a plan view of the cooking device according to Figure 3, Figure 5 is a plan view of a third construction of the cooking device, Figure 6 is a view of another cooking vessel with wire basket insert for use with the cooking device according to Figure 5, Figure 7 is a vertical section of the fourth construction of the electric cooking device, Figure 8 is a section along the line A—A of Figure 7, Figure 9 is a vertical section of a fifth construction of the electric cooking device, Figure 10 is a section along the line B—B of Figure 9, Figure 11 is a vertical section of a sixth construction of the electric cooking device, Figure 12 is a vertical section of a seventh construction of the electric cooking device, Figure 13 is a perspective view of a modification of the electric cooking device, and, Figure 14 is a perspective view of a further modification of the electric cooking device.

The electric cooking device according to Figure 1 comprises a housing 1 of circular or square section. In the upper part of the housing 1 there is mounted, on brackets 3, a lining 2 of heat-insulating material, on the inner surface of which there is provided an annular electric heating plate 4. In the housing 1 there is also mounted, on spring supports 5, a plate 6 of heat-insulating, electrically non-conducting material, on which is mounted a flat electric heating plate 7. The heating plate 7 is connected by a cable 8, and the annular heating plate 4 by a cable 9, to a switch-box 10 provided on the outside of the housing 1, and in which are provided switches 11 and 12 respectively for each of the two heating plates 4 and 7. A plug socket 13 for connecting a cable 14 in communication with a source of current supply is connected to the switch-box 10.

By mounting the plate 6 on the spring support 5 the flat heating plate 7 is pressed against the bottom of a cooking vessel 15 inserted in the annular heating plate 4; differences in the heights of various cooking vessels may be equalised by the fact that the cooking vessel by its weight presses the heating plate 7 more or less downwardly until the rim 16 of the vessel 15 rests on the upper annular surface of the heating plate 4 thus covering the space between it and the annular heating plate 4.

Instead of the cooking vessel 15, which rests completely on the annular heating plate 4, a cooking vessel 17 (Figure 2) may also be used which is formed at the bottom with a shoulder 18 and a projecting part 19 of lesser diameter, the part 19 alone engaging the annular heating plate 4, and the shoulder 18 resting on the upper annular surface of the heating plate 4.

The electric cooking device according to Figures 3 and 4 is formed with a housing 20, in which on spring support 21 there is mounted a plate 22 of electrically non-conducting, heat-insulating material, on which is provided a circular electric heating plate 23. In this construction, for heating the outer surface of the cooking vessel, in the upper part of the housing 20, four electric heating plates 24 are provided each of which forms a quarter of a cylinder and which are provided on their outside with a heat-insulating lining 25. The heating plates 24 are each provided on their outer surfaces with two guide bolts 26 which are guided in guides 27 provided on the inside of the housing 20. Around the guide bolts 26 and the guides 27 pressure springs 28 are provided which press the heating plates 24 radially inward, that is to say, against the outer surface of the cooking vessel. The heating plates 24 are of such dimensions that, when resting on the outer surface of the cooking vessels, there is a maximum space between them of 2 mm. On the outside of the housing 20 there is provided a switch-box 29 on which there is also provided a plug socket 30 for the plug 31 of a connecting cable. The heating plate 23 is connected by a cable 32 with a switch 33 of the switch-box 29. The heating plates 24 are connected with one another by cables and with a second switch 35 of the switch-box 29 by a cable 34.

The electric cooking device illustrated in Figure 5 corresponds to a great extent to the cooking device according to Figures 3 and 4. It possesses, however, a rectangular housing 20' in which is mounted on spring supports 21' a rectangular plate 22' of electrically non-conducting heat-insulating material on which is provided a rectangular electric heating plate 23'. For heating the outer surface of the cooking vessel there are provided four flat electric heating plates 24' which are provided on the outside with heat insulating linings 25'. These heating plates 24' are provided on their outsides with two guide bolts 26' each of which is guided in a guide 27' mounted on the inner surface of the housing 20'. On the guide bolts 26' and the guides 27' there are provided pressure springs 28' which press the heating plates 24' inwardly. The heating plates 24' are of such dimensions that a space of a maximum of 2 mm. exists at the corners between them, when they rest on the outer surface of the cooking vessel. The remaining parts of this cooking device correspond exactly to those of the cooking device described with reference to Figures 3 and 4.

Figure 6 is the cooking device for use with the cooking vessel according to Figure 5, and which serves particularly for the preparation of food which is fried in deep fat (fritters). The cooking vessel 36 of rectangular section has at the bottom a projecting part 38, also of rectangular form, with shorter edge lengths, which is destined to be inserted in the cooking device. In the cooking vessel 36 there is mounted a closely fitting wire basket 39 which may be lifted out. The food to be cooked in the boiling fat contained in the cooking vessel 36 is placed in the wire basket 39 and after being cooked, lifted in the basket from the cooking vessel 36.

In the electric cooking device illustrated in Figures 7 and 8, in the middle of the bottom of a cylindrical housing 41, there is mounted a circular, plate-like base 42 of electrically non-conducting material, on which a round flat heating plate 45 provided at the bottom with a heat-insulating lining 44, is mounted on four pressure springs 43. The heating wires, denoted by the reference 46, of the heating plate 45, which are embedded in a ceramic mass, are connected by flexible copper strips 47 with clamping pieces, not shown in the drawing, provided in the base 42, and from which a cable 48 provided with bead insulation leads to the switch 49 provided on the outside of the jacket of the housing 41. Around the heating plate 45 four curved vertical heating plates 50 are provided which have on their outsides heat-insulating linings 51, and which, when completely slid together, form a hollow cylinder, surrounding the heating plate 45 and surmounting it, the inner diameter (of the hollow cylinder) corresponding to the diameter of the heating plate 45. The heating wires 52 embedded in a ceramic mass, of the heating plates 50 are connected by flexible cables 53, provided with bead insulation, with clamping pieces 54 disposed on the circumference of the base 42, to which are connected the conductors of a cable 55, also provided with bead insulation, which leads to a second switch 56 provided on the outside of the jacket of the housing 41. On the jacket of the housing 41 there is further provided a plug socket 57, from which the cables, provided with bead insulation, branch off to the switches 49 and 56 and which serve to connect the cooking device to a source of current by means of a cable 58 provided with a plug 58.

On the outer face and in the middle of each heating plate 50 there is provided a support 60 extending radially outward. The support 60 is displaceable in the guide 62 mounted radially in the intermediate bottom 61 fixedly mounted in the upper part of the housing 41. A pressure spring 63 bears at the bottom on the outer extremity of the guide 62, and presses the support 60 with heating plate 50 connected to it inwardly against the heating plate 45. To each support 60 there is secured the end of a wire cable 64 which is led over guide rolls 65 and 66 mounted on the inside wall of the housing 41 and the other end of which is secured to a common ring 67, rotatably mounted on the base 42, and on which is provided a lever 68 the end of which extends through a slit 69 in the jacket of the housing 41. By means of the lever 68 the ring 67 may be rotated on the base 42 which results in the supports 60 with the heating plates 50 mounted on them being pulled together, over the wire ropes 64, outwardly in opposition to the effects of the pressure springs 63 acting on them. In the position in which the heating plates 50 are in their outermost position, the lever 68 may engage in a notch 70 provided in the jacket of the housing 41 in such manner that the heating plates 50 are fixed in this position until the lever 68 is disengaged from the notch. The housing 41 is formed with a cover plate 72, stiffened by ribs 71, the opening of which receives the cooking vessel and the inner edge of which serves as a support for the cooking vessel. The radially displaceable heating plates in their outermost position are disposed completely below the annular cover plate 72 thus laying the opening completely open whilst in their innermost position, that is to say, when they rest on the round heating plate 45, they project partly from the inner edge of the cover plate 72.

For this cooking device, similar cooking vessels may be used as for the cooking devices first described. After the heating plates 50 have been brought into their outermost position by means of the lever 68, the cooking vessel is inserted in the opening of the cover plate 72, the heating plate 45 pressing downwardly in opposition to the action of the pressure springs 43 acting on it until the flange rests on the inner edge of the cover plate 72 closing the housing 41 at the top. The heating plate 45 is, however, pressed to the bottom of the cooking vessel by means of the pressure springs 43. After disengaging the lever 68 from the notch 70 of the slit 69, the heating plates 50 are displaced radially inwardly by the pressure springs 63 acting on them and pressed against the side wall of the frying pan. The heating plate 45 and the heating plates 50 may then be switched-on by means of the switches 49 and 56. As thus not only the bottom of the frying pan, but also its side wall is heated, a rapid and strong heating results which is of great advantage for the preparation of many tasty foods. It is possible to switch on the heating plate 45 only, or only the heating plates 50 if this is more advantageous for the preparation of certain dishes. The switches 49 and 56 may also be constructed as intermittent switches.

The electric cooking device illustrated in Figures 9 and 10 is provided with a prismatic housing 73 of rectangular section. In the middle of the bottom of the housing 73 there is provided a circular plate-like base 74 of electrically non-conducting material on which is mounted, on four spring supports 75, an electric heating plate 77 provided at the bottom with a lining 76 of electrically non-conducting material and of rectangular section. Around the heating plate 77 there are provided, parallel to the side walls of the housing 73, four vertical heating plates 78 which are provided on their outer surfaces with a heat-insulating lining 79. Each of these heating plates 78 is provided on its outer face with a guide peg 80 which is guided in a guide housing 81 provided in the corresponding lateral wall of the housing 73. In this guide housing 81 there are inserted pressure springs 82 which press the heating plates 78 inwardly. The four heating plates 78 limit a prismatic space, lying above the heating plate 77, which receives a corresponding prismatic projecting part of a cooking vessel, to the side walls of which the heating plates 78 are pressed by means of the pressure springs 82, the size of the heating plates 78 being such that, when they rest on the lateral walls of the projecting part of the cooking vessel, only very small spaces are left. To each heating plate 78 there is connected one end of a lever 83, the other end of which is pivotally mounted on an axis 84 at the bottom of the housing 73. On the base 74 there is rotatably mounted a ring 85 on the circumference of which are provided four pivots 86. On each of the pivots 86 there is mounted a guide 87, the inner end of which, having an inner thread, extends through an opening in one of the levers 83. Inside each lever 83 lies an adjusting nut 88, screwed on the thread of the guide 87, and which is fixed in its position by a lock-nut 89. On the ring 85 is secured a hand lever 90 which extends through a slit 91 provided on the front of the housing 73. With the aid of this hand lever 90 the ring 85 may be rotated between two end positions. When the heating plates 78 rest on the walls of the projecting part of the cooking vessel, the guides 87 are in an inclined position relative to the radial direction (Figure 10). When the ring 85 is turned to its other end position by means of the hand lever 90, the guides 87 are brought into the radial direction up to somewhat beyond the dead point position, the adjusting nuts 88 on the threads pressing the levers 83 outwardly which results in the heating plates 78 connected with them being removed from the side walls of the projecting part of the cooking vessel. In other respects, the cooking device corresponds to the cooking device described with reference to Figures 7 and 8.

The cooking device according to Figure 11 is a modification of the cooking device according to Figures 3 and 4. 92 is a cylindrical or rectangular housing in which is disposed a heating plate 93, heating the bottom of the cooking vessel, and which is provided at the bottom with an electrically non-conducting heat insulating lining 94, and four vertical heating plates 95 heating the outer surface of the cooking vessel, and which are also provided on the outside with a heat insulating, electrically non-conducting lining 96. The heating plates 95 are provided on the outside with two guide bolts 97 each of which is guided in guide boxes 98 provided on the inside of the housing 92. On the guide bolts 97 and the guide boxes 98, there are provided pressure springs 99 which press the heating plates 95 inwardly, that is to say, against the outer surface of the cooking vessel. The heating plate 93 is mounted on bearing supports 100 which are provided with detachable elongating members 101. If the bearing supports 100 are used without the elongating members 101, the cooking device corresponds exactly to the constructions described with reference to Figures 3 and 4. The power supply and the arrangement of the switches are exactly the same. If, however, the bearing supports 100 with the elongating members 101 are used, the heating plate 95 lies by approximately 2 mm. above the cover plate of the housing 92, and it may now be used exactly as a normal electric heating plate.

The same purpose is aimed at in the construction of the cooking device according to Figure 12, in which 102 denotes the housing, and 103 four electric heating plates disposed in its upper part and provided on the outside with a heat-insulating lining 104 heating the outer surface of a cooking vessel. A heating plate 105 heating the bottom of the cooking vessel and provided at the bottom with a heat-insulating lining 106, is mounted on a column 107 which is displaceably guided in a vertical guide 108. At the lower end of this column 107 there is pivotally mounted one of the shanks of a two-shanked lever 109 which is mounted on a bearing support 110 in the housing 102. The other shank of the lever 109 extends through a slit 111 in the wall of the housing 102 and is constructed as a hand lever. By pressing the lever 109 down and engaging it in a notch 112 provided in the wall of the housing 102 the heating plate 105 may be lifted up to approximately 2 mm. above the cover plate of the housing 102 and locked in this position. When the lever 109 is disengaged from the notch 112, the heating plate 105 may be lowered until it rests on the resilient supports 113 provided on it. The power supply for the heating plates 103 and 105 and the arrangement of the switches are the same as in the constructions previously described.

Corresponding devices for lifting the electric heating plate and heating the bottom of the cooking vessel may also be provided in the other constructions described above.

In Figure 13 there is shown a cooking device similar to a rechaud (small stove), which is provided with a prismatic housing 114. The electric heating plate heating the bottom of the housing and vertically displaceable is denoted by the reference 115, and on the front of the housing 114 there is provided for it an intermittent switch 116. Around the heating plate 115 there are disposed three radially displaceable vertical heating plates 117 for which a second intermittent switch 118 is provided at the front of the housing 114. For the displacement of the heating plates 117 a lever 120 is mounted in a slit 119 in the front of the housing 114, and is adapted to engage in the position which corresponds to the outermost position of the heating plates 117, in a notch 121 of the slit 119 in the wall of the housing 114.

The cooking device according to Figure 14 has the form of a cooking stove in the top plate 122, of which, there are inserted two cooking devices of the kind described. One of the cooking devices has an electric heating plate 123 heating the bottom of the cooking vessel, and is displaceably and resiliently mounted, and three radially displaceable electric heating plates 124 heat the outer surface of the cooking vessel. On the front of the housing there is provided an intermittent switch 125 for the heating plate 123 and an intermittent switch 126 for the heating plates 124. For the displacement of the heating plates 124 pressed inwardly by the action of springs there is provided at the front of the cooking stove a foot lever 127 which acts on the heating plates 124 through a rod. The other cooking device has a vertically displaceable and resiliently mounted rectangular electric heating plate 128 heating the bottom of the cooking vessel and for which at the front of the cooking stove there is provided an intermittent switch 129 and four vertical displaceably mounted electric heating plates 130 disposed around the heating plate 128, and heating the lateral walls of a cooking vessel, and for which there is provided at the front of the cooking stove an intermittent switch 131. For raising the heating plates 130 from the side walls of the cooking vessel there is provided at the front of the cooking stove a second foot lever which acts through a rod on the heating plates 130 which are acted on by springs. In the cooking stove there is further provided an oven 133 and a dish-heating oven 134 for which two further intermittent switches 135 and 136 are provided at the front of the cooking stove. As the cooking vessels, during cooking, are held fast between the heating plates 124 and 130 respectively, they need not be held when turning over or stirring the boiling food. This enables a person to supervise and attend to both cooking vessels at the same time.

I claim:

1. In an electric stove in combination, a supporting casing; at least three electric heating elements located inside said supporting casing and having substantially vertical heating surfaces facing one another and defining a well for receiving a cooking vessel, each of said electric heating elements being supported in said supporting casing for movement in a horizontal direction between an inner operative position and an outer inoperative position, and adapted to engage in said inner operative position the side walls of a cooking vessel placed in said well; at least three first spring means located in said supporting casing, each of said first spring means having one end abutting against said supporting casing and the other end urging one of said electric heating elements into operative position; manually operated means mounted in said supporting casing and connected to said electric heating elements for retracting the same against the action of said first spring means from said operative into said inoperative position; means for holding said manually operated means in a position corresponding to said inoperative position of said heating elements against the action of said first spring means; at least one second spring means located below said well in said supporting casing and having one end abutting against said supporting casing; and at least one electric heating unit located in said well resiliently supported by the other end of said second spring means and urged upwardly by the same, said electric heating unit having a substantially horizontal heating top surface adapted to engage the bottom face of a cooking vessel placed in said well, so that the weight of said cooking vessel forces said electric heating unit downwardly against the action of said second spring means.

2. In an electric stove in combination, a supporting casing; four electric heating elements located inside said supporting casing and having substantially vertical arcuate heating surfaces facing one another and defining a cylindrical well for receiving a cooking vessel, each of said electric heating elements being supported in said supporting casing for movement in a horizontal direction between an inner operative position and an outer inoperative position, and adapted to engage in said inner operative position the side walls of a cooking vessel placed in said well; four first spring means located in said supporting casing, each of said first spring means having one end abutting against said supporting casing and the other end urging one of said electric heating elements into operative position; manually operated means mounted in said supporting casing and connected to said electric heating elements for retracting the same against the action of said first spring means from said operative into said inoperative position; means for holding said manually operated means in a position corresponding to said inoperative position of said heating elements against the action of said first spring means; at least one second spring means located below said well in said supporting casing and having one end abutting against said supporting casing; and at least one electric circular heating unit located in said well resiliently supported by the other end of said spring means and urged upwardly by the same, said electric heating unit having a substantially horizontal heating top surface adapted to engage the bottom face of a cooking vessel placed in said well, so that the weight of said cooking vessel forces said electric heating unit downwardly against the action of said second spring means until a projecting portion on the cooking vessel engages the upper rims of said heating elements.

3. In an electric stove, in combination, a supporting casing; a plurality of electric heating elements located inside said supporting casing and having substantially vertical oppositely arranged heating surfaces defining a well for receiving a cooking vessel, each of said electric heating elements being supported in said supporting casing for movement in a horizontal direction between an inner operative position and an outer inoperative position, and adapted to engage in said inner operative position the side walls of a cooking vessel placed in said well; spring means located in said supporting casing abutting against the same and urging said electric heating elements into said operative position; manually operated means mounted in said supporting casing and connected to said electric heating elements for retracting the same against the action of said spring means from said operative into said inoperative position; means for holding said manually operated means in a position corresponding to said inoperative position of said heating elements against the action of said spring means; at least one further spring means located in said supporting casing below said heating elements and having one end abutting against said supporting casing; and at least one electric heating unit resiliently supported by the other end of said further spring means and urged upwardly by the same, said electric heating unit being adapted to engage the bottom face of a cooking vessel placed in said well between said heating elements.

ALFRED WEHRLI.

References Cited in the file of this patent

UNITED STATES PATENTS

| Number | Name | Date |
|---|---|---|
| Re. 19,717 | Lipham | Oct. 1, 1935 |
| 1,316,190 | Sackerman | Sept. 16, 1919 |
| 1,704,413 | Wait | Mar. 5, 1929 |
| 1,730,042 | Pendleton | Oct. 1, 1929 |
| 1,971,337 | Scoville | Aug. 28, 1934 |
| 2,025,252 | Stencell | Dec. 24, 1935 |
| 2,257,580 | Trompeter | Sept. 30, 1941 |
| 2,404,987 | Rudd | July 30, 1946 |
| 2,421,373 | Cozza | June 3, 1947 |

FOREIGN PATENTS

| Number | Country | Date |
|---|---|---|
| 245,949 | Switzerland | Aug. 16, 1947 |
| 468,998 | Great Britain | July 16, 1937 |
| 584,817 | Great Britain | Jan. 23, 1947 |
| 768,010 | France | July 30, 1934 |